United States Patent
Gross et al.

(10) Patent No.: US 9,981,677 B1
(45) Date of Patent: May 29, 2018

(54) DISPOSABLE CART

(71) Applicants: Jason T. Gross, Phoenix, AZ (US); Jay B. Hall, Kansas City, MO (US); Susan I. Tripp, Kansas City, MO (US)

(72) Inventors: Jason T. Gross, Phoenix, AZ (US); Jay B. Hall, Kansas City, MO (US); Susan I. Tripp, Kansas City, MO (US)

(73) Assignee: TrippNT, Inc., Kansas City, MO (US)

( * ) Notice: Subject to any disclaimer, the term of this patent is extended or adjusted under 35 U.S.C. 154(b) by 0 days. days.

(21) Appl. No.: 15/086,013

(22) Filed: Mar. 30, 2016

(51) Int. Cl.
| | |
|---|---|
| *A47B 31/00* | (2006.01) |
| *B62B 3/00* | (2006.01) |
| *A47B 47/06* | (2006.01) |
| *A47B 47/04* | (2006.01) |
| *A47B 47/02* | (2006.01) |
| *A47B 47/00* | (2006.01) |

(52) U.S. Cl.
CPC .............. *B62B 3/005* (2013.01); *A47B 31/00* (2013.01); *A47B 47/0075* (2013.01); *A47B 47/02* (2013.01); *A47B 47/042* (2013.01); *A47B 47/06* (2013.01); *A47B 2031/003* (2013.01)

(58) Field of Classification Search
CPC ... A47B 31/00; A47B 31/04; A47B 2031/003; A47B 2031/002; A47B 47/0066; A47B 47/0075; A47B 47/042
See application file for complete search history.

(56) References Cited

U.S. PATENT DOCUMENTS

| | | | | |
|---|---|---|---|---|
| 4,082,389 A | * | 4/1978 | Stewart ................ | A47B 47/042 312/258 |
| 4,153,311 A | * | 5/1979 | Takahashi ............ | A47B 47/042 108/162 |
| 4,832,421 A | * | 5/1989 | Shoffner .............. | A47B 47/042 312/263 |
| 6,193,340 B1 | * | 2/2001 | Schenker ........... | A47B 47/0075 312/108 |
| 8,832,917 B1 | * | 9/2014 | Elliott ..................... | B23P 17/00 29/428 |
| 2003/0066813 A1 | * | 4/2003 | Taylor .................. | A47B 47/042 211/186 |
| 2005/0252425 A1 | * | 11/2005 | Dardashti .......... | A47B 47/0075 108/61 |
| 2009/0304464 A1 | * | 12/2009 | Bjarno ................... | B65G 53/20 406/168 |
| 2010/0173122 A1 | * | 7/2010 | Susnjara .............. | A47B 47/042 428/119 |
| 2013/0234576 A1 | * | 9/2013 | Hixson ................ | A47C 13/005 312/265.5 |
| 2013/0256253 A1 | * | 10/2013 | Stuby .................... | A47B 47/00 211/186 |
| 2014/0030017 A1 | * | 1/2014 | Luo ...................... | A47B 47/042 403/375 |
| 2014/0373357 A1 | * | 12/2014 | Elliott ..................... | B23P 11/00 29/897 |

* cited by examiner

*Primary Examiner* — Daniel Rohrhoff
(74) *Attorney, Agent, or Firm* — Julie Scott (57) ABSTRACT

The present invention provides disposable mobile storage units and supply carts, their methods of assembly and use. More particularly, the invention relates to carts that are lightweight, reusable, collapsible, recyclable, and suitable for use in a wide variety of industries.

14 Claims, 8 Drawing Sheets

DISPOSABLE CART

BACKGROUND OF THE INVENTION

A. Field of the Invention

The present invention relates generally to disposable mobile storage units and their methods of assembly and use. More particularly, the invention relates to carts that are lightweight, reusable, collapsible, and recyclable.

B. Description of the Related Art

The use of carts in the laboratory, research, and medical fields is well known. The importance of transporting and storing supplies for use in these disciplines cannot be underestimated. Yet, many of the carts and storage options that are currently available do not meet certain needs. For example, the need to quickly setup laboratory, research, or medical operations in a field setting creates certain mobility and storage challenges that are often not found in non-field operations. Field clinics that respond to epidemic, catastrophic, or other life-threatening emergencies, as well as, on-site laboratories in primitive or remote areas must move quickly and have supplies ready for use without using valuable hours for equipment assembly. The enhanced needs for sanitation and sterility that such circumstances present add further challenges.

Other disciplines such as veterinary, health and beauty, food services, pet grooming, crafts, manufacturing, automotive repair supplies, as well as, others often face similar challenges of needing mobile storage units that can be easily transported and setup for use. Similarly, temporary events such as blood drives, trade shows, concerts, fairs, festivals, business events, and school functions face mobility and storage challenges couple with time and cost constraints. Often modern day transport and storage solutions are bulky and heavy, and not easily transported to locations where they are needed.

A need exists for a solution that provides adequate storage and is fast and easy to setup. A lightweight, sturdy, and environmentally-friendly solution is desirable. Preferably, the solution is adaptable so that users can configure storage to their own particular space and environment and still have ready access to supplies. A solution also needs to be comparatively easy and inexpensive to transport and store. The added benefit of being recyclable so that clean up and re-transportation is reduced or eliminated is also desirable.

SUMMARY OF THE INVENTION

The present invention addresses the aforesaid challenges by providing a variety of supply carts and storage units. The supply carts, or storage units, are lightweight, yet sufficiently durable for repeated use and can be easily assembled into a variety of configurations. After use, the carts or units may be recycled as they are either completely or predominantly constructed of biodegradable, environmentally friendly materials.

Advantageously, supply carts and storage units of the present invention can be shipped comparatively easily and inexpensively because they are relatively lightweight and can be transported in an unassembled configuration. Upon receipt, a user can easily assemble a cart or unit without any special tools or specialized knowledge. Once fully assembled, a significant number of supplies can be stored and mobilized in each unit.

When not in use or in preparation for disposal, the units can be broken down, i.e. disassembled. For disposal, disassembled units can be separated into recyclable materials, and if present, non-recyclable materials.

Preferred embodiments of the invention have the storage units mounted on lightweight wheels, more preferably on lightweight swivel wheels or casters. Preferred swivel wheels and casters have a stem that is a threaded fastener. Most embodiments that have wheels include four wheels. Those of skill in the art will recognize that the number of wheels can be varied. For example, only one or two wheels may be used if the user partially lifts the unit in order to move the unit. Alternatively, more than four wheels may be used if desired.

Preferably, at least one, and more preferably two wheels are swivel wheels or casters that have a locking function. Those of skill in the art will recognize that more wheels, even all wheels, may include a locking function.

Embodiments of the invention having wheels also include a reinforced or strengthened base. Preferably, the base is strengthened and made ready to accept wheels by having caster mounts preferably made of plastic, more preferably a thermoplastic resin such as polyvinylchloride (PVC) plastic. The wheel can be attached to a caster mount with a washer placed below the caster mount and screwed to the fastener that is either part of or attached to the wheel. In alternative embodiments, the base is strengthened by using caster mounts made of material such as metal, metal alloys, cardboard, foam board, wood, plastic, or a combination thereof.

Alternatively, one or more wheels may be replaced by one or more legs, or other extensions, such that the base of a unit is elevated above the ground or floor. Less desirably, no wheels, legs, or other extensions may be present on a unit. Those of skill in the art will recognize that the absence of wheels reduces the mobility of a unit, and moisture may more easily penetrate a unit through its base if the base is allowed to rest directly on a surface.

While any number of fasteners is known in the art and may be used to assemble embodiments of the invention, it is preferred that embodiments of the invention are assembled by using interlocking parts. Preferably, the top, bottom, back, sides, and shelves connect together by the insertion of a variety of tabs, or extensions, into slots, grooves, notches, and hooks that form a portion of the respective parts. Additional parts, such as trim pieces, also may include tabs, extensions, slots, grooves, notches, or hooks that connect and join together with other pieces of a unit or cart. The extensions, slots, grooves, notches, and hooks join and hold together tightly enough (i.e. interlock) such that an assembled cart or unit is sturdy.

Storage units of the invention comprise a top, a bottom, a back, a first and second side, a first trim piece, a second trim piece, a first and second bridge, and at least a first shelf. Preferred embodiments of the invention include at least one second shelf. More preferably, two or more second shelves are included in a storage unit.

A back of a storage unit includes a first horizontal slot, a first tab extending upward from a top edge, a second tab extending downward from a bottom edge, and a vertical notch extending from each lateral surface. (Herein, unless otherwise indicated, all positional references are as viewed from the front of a storage unit.) Preferably, the back includes a second horizontal slot below the first horizontal slot. More preferably, a back includes two or more second horizontal slots.

Each of the first and second sides of a storage unit include a top groove extending from an anterior surface of a respective side into an anterior portion of a respective side; a first groove below the top groove, wherein the first groove extends from an anterior surface of a side into an anterior portion of a side; a first anterior vertical slot adjacent to a second anterior vertical slot, wherein both first and second anterior slots are near the top of a side; a first posterior vertical slot adjacent to a second posterior vertical slot, wherein both the first and second posterior slots are near the top of a side; and an anterior tab with a horizontal slot and a posterior tab with a horizontal slot, wherein the anterior and posterior tabs are near the bottom of a side. Preferably, each side includes a second groove below the first groove, wherein the second groove extends from an anterior surface of a side into an anterior portion of the side. More preferably, each side includes two or more second grooves.

A top of a storage unit includes a horizontal notch extending from each lateral surface of the top, wherein each horizontal notch inserts into a top groove of a side; and a tenon in a ventral surface of the top such that the first tab of the back inserts into the tenon of the top. The tenon may extend all the way through the top such that when viewed from above, the tenon creates a hole in the top. Preferably, the tenon does not extend all the way through the top. Instead, the tenon forms a shallow groove or trench in the ventral surface of the top, so that when the storage unit is assembled, the dorsal surface of the top provides a solid surface suitable for the storage of various items.

A bottom of a storage unit has a posterior opening such that the second tab of the back inserts into the posterior opening. The bottom also has first and second anterior side openings, wherein an anterior tab of each side inserts into the first and second anterior side openings. And, the bottom also includes first and second posterior side openings, such that a posterior tab of each side inserts into the first and second posterior side openings. Preferably, the bottom further includes an anterior opening. Also preferably, the bottom further includes an access hole adjacent to the first and second anterior side openings and to the first and second posterior side openings. Advantageously, each access hole provides easier access for attaching each wheel during assembly. When access holes are present, a caster cap is provided to cover each access hole after assembly so that the assembled cart has a trimmer look.

Storage units of the invention include at least a first shelf having a first horizontal notch extending from each lateral surface of the first shelf, such that each first horizontal notch inserts into a first groove of a side, and a first rear tab extending from a posterior surface such that the first rear tab inserts into the first horizontal slot of the back. Preferably, storage units of the invention also comprise a second shelf having a second horizontal notch extending from each lateral surface of the second shelf, wherein each second horizontal notch inserts into a second groove of a side, and a second rear tab extending from a posterior surface of the second shelf such that the second rear tab inserts into a second horizontal slot of the back. Storage units of the invention can include two or more second shelves.

First trim pieces of a storage unit of the invention include first and second foldable tabs, wherein each foldable tab extends from a lateral side of a first trim piece such that each foldable tab inserts into the first anterior vertical slot of a side, the foldable tab folds over, and inserts into the second anterior vertical slot of a side.

Second trim pieces of a storage unit of the invention include first and second foldable tabs, wherein each foldable tab extends from a lateral side of a second trim piece such that each foldable tab inserts into the first posterior vertical slot of a side, the foldable tab folds over, and inserts into the second posterior vertical slot of a side.

The first and second bridges of a storage unit of the invention are similar to each other. The first bridge inserts through the horizontal slots of the anterior tabs of the first and second sides, and the second bridge inserts through the horizontal slots of the posterior tabs of the first and second sides.

Preferably, storage units of the invention also comprise at least a first caster mount, a first wheel having a threaded stem, and a first nut, wherein the first caster mount attaches to either the first or second bridge, and the first wheel attaches to the first caster mount and the first nut attaches to the threaded stem to secure the first wheel in place. (If a first wheel does not include a threaded stem, then a first fastener having a first and a second end is used. Where present, the first end of the first fastener attaches to the wheel and the second end of the first fastener attaches to first nut to secure the first wheel in place.) More preferably, storage units comprise at least one second caster mount, one second wheel having a threaded stem, and one second nut, wherein the second caster mount attaches to either the first or second bridge that is not already attached to the first caster mount, and the second wheel attaches to the second caster mount, and the second nut secures the second wheel in place. Most preferably, a storage unit comprises three or more second caster mounts, three or more second wheels having threaded stems, and three or more second nuts.

Those of skill in the art will recognize that wheels, fasteners, and nuts are generally constructed of metal, plastic, or a combination thereof. It is expected that any suitable wheels, fasteners, or nuts may be used in the invention.

In certain embodiments, storage units of the invention further comprise a front bottom trim piece having a bottom tab that inserts into the anterior opening of the bottom.

In certain embodiments, storage units of the invention further comprise at least one drawer. In other embodiments, storage units comprise two drawers, and in other embodiments, three or more drawers are present. Those of skill in the art will recognize that a user may reconfigure a storage unit to meet changing needs and may choose to alter the number of drawers in a unit.

Preferably, storage units of the invention further comprise a second shelf having a second horizontal notch extending from each lateral surface of the second shelf, such that each second horizontal notch inserts into a second groove of a side; and a second rear tab extending from a posterior surface such that the second rear tab inserts into a second horizontal slot of the back. More preferably, storage units of the invention comprise three or more second shelves.

The storage units of the invention may be constructed from of a variety of suitable materials. Preferably, storage units or supply carts of the invention are mainly constructed of disposable materials. Numerous suitable materials are known in the art. Suitable materials have one or more of the following characteristics: rigidness, dimensional stability, a flat and smooth surface, lightweight, durable, dent-resistant, and scratch and warp resistance. Preferred materials include cardboard, metal, plastic, foam board, wood, glass, or a combination thereof. More preferred materials include corrugated cardboard sheets or boards, plastic sheets or boards, foam plastic sheets or boards, solid plastic sheets or boards, or combinations thereof. Exemplary materials include corrugated paper or plastic in a plain or laminated form. Corrugated cardboards can be single, double, or triple walled. Materials having a honeycomb core are considered to be particularly suitable for the invention. Honeycomb cored materials are known in the art. An exemplary honeycomb cored material is Falconboard®, which is made of recycled paper. Other suitable honeycomb cored materials are made of paper, plastic, other non-metallic materials, or a combination thereof. Corrugated core materials are also known in the art. Such materials are known to be tough, lightweight, and can also be waterproof and stain-resistant and can be made of paper, plastic, other non-metallic materials, metal, or a combination thereof. An exemplary corrugated core material suitable for use in the invention is Coroplast®. In some embodiments, storage units may be composed of metal such as steel, aluminum, other metal alloys, a combination of metal and non-metallic material (such as plastic), or a combination thereof. Exemplary combination products suitable for constructing storage units of the invention include Dibond®, Epanel®, and Alupanel®. Those of skill in the art will appreciate that any combination of materials that have the desired characteristics that yield a sturdy cart or unit can be used.

Other objects, features, and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

The invention provides storage units and supply carts suitable for a wide variety of uses. The supply carts, or storage units, are lightweight, yet sufficiently durable for repeated use and can be easily assembled into a variety of configurations. Because the units or carts can be shipped and stored in an unassembled configuration, shipping and storage costs are relatively low as compared to other storage carts.

Storage units or supply carts of the invention can be assembled into a variety of configurations. For example, a user may prefer to use many short shelves or combine shelves of varying height in a single unit or cart. Drawers may be placed on shelves or removed as desired. If desired, a trim piece may be attached to the front of a shelf to help secure items or a drawer that are placed on a shelf. Each trim piece attached to a shelf would be secured in a similar manner as described herein for a bottom trim piece.

Preferably, drawers are made of cardboard. But, users may prefer to use drawers made from a variety of other materials such as wood, glass, plastic, metal, or other suitable materials or combinations thereof. If cardboard drawers are used, then they may be assembled by folding the cardboard into tray-like three-dimensional shapes. Multiple size iterations of these drawers can be used. Preferably, the cardboard is pre-cut and pre-scored to provide easy guidance for assembly. These drawers can be placed into the cart body on the shelves, and can slide freely in and out. Preferably, a drawer stays in place on a shelf by friction against the top surface of the shelf. Those of skill in the art will recognize that a drawer can also be held in place by adding a locking mechanism. A wide variety of locking mechanisms are known in the art and available to users.

Preferred embodiments include a large hole or slot near the top of each side that can serve as handles for the manipulation of the cart. Preferably, these holes or slots comfortably fit an average adult's hands.

The cart body can gain elevation up from the cart base and caster mounts by affixing the sides and back to each other at right angles creating a roughly "U-shape". The open end of the approximate "U-shape" forms the front of the cart. The user has access to the open storage of the cart from the front. Horizontal shelves can be placed into the cart body from the front. Preferably, the shelves are connected to the sides and back of the cart by inserting a portion of each shelf through slots that are in the sides and back pieces of the cart.

Figure 1:
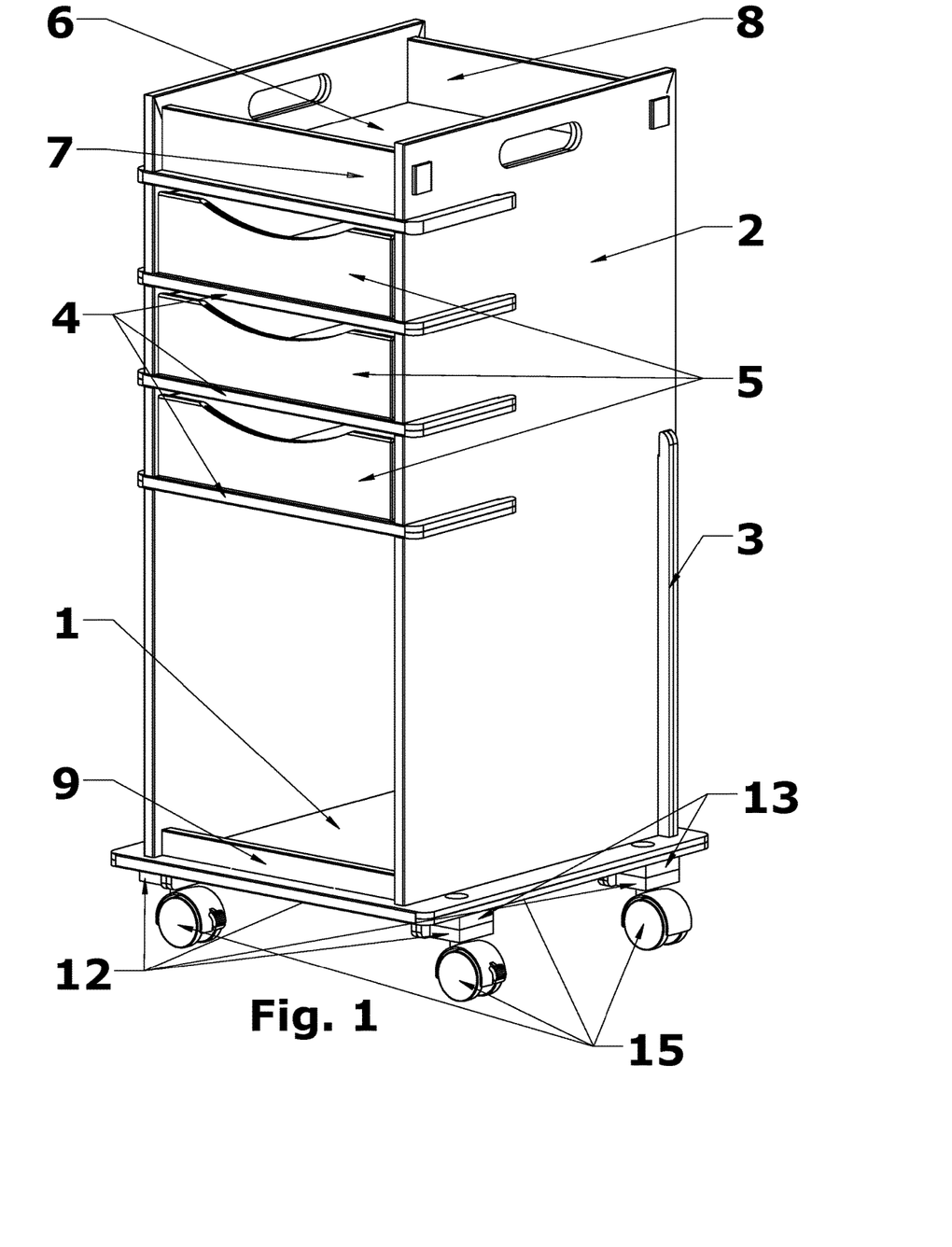
FIG. 1 is a front perspective view of a fully assembled cart.

Referring now to the drawings displaying exemplary embodiments of the invention, FIG. 1 shows an assembled, three-drawer embodiment of a supply cart. In this example, the cart is comprised of a bottom or base 1 with casters 15 attached, two sides 2 and a back 3, individual shelves 4, with drawers 5, and a top 6. Three trim pieces are illustrated, two being on the top, i.e. the top trim pieces 7 and 8, and one at the front bottom, i.e. the bottom trim piece 9.

Figure 2:
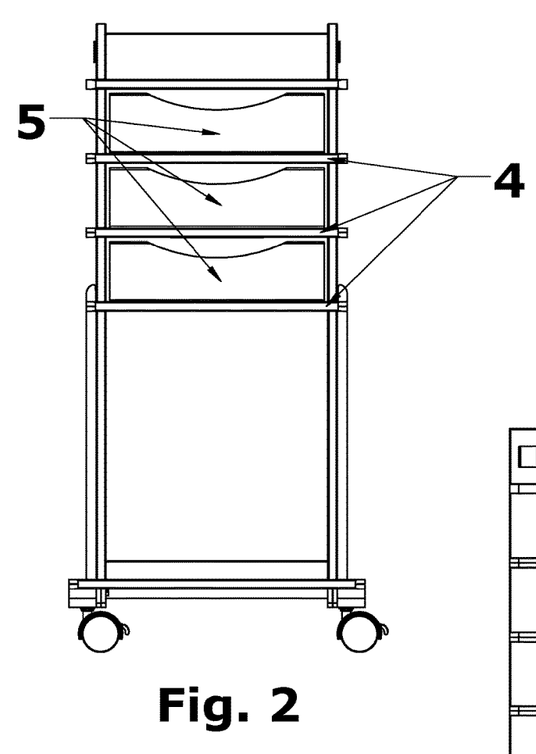
FIG. 2 is a front view of a fully assembled cart.
Figure 3:
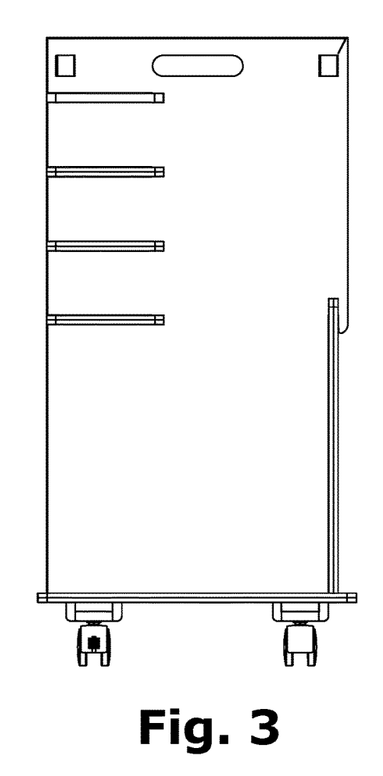
FIG. 3 is a right side view of a fully assembled cart.
Figures 4A, 4B, 5:
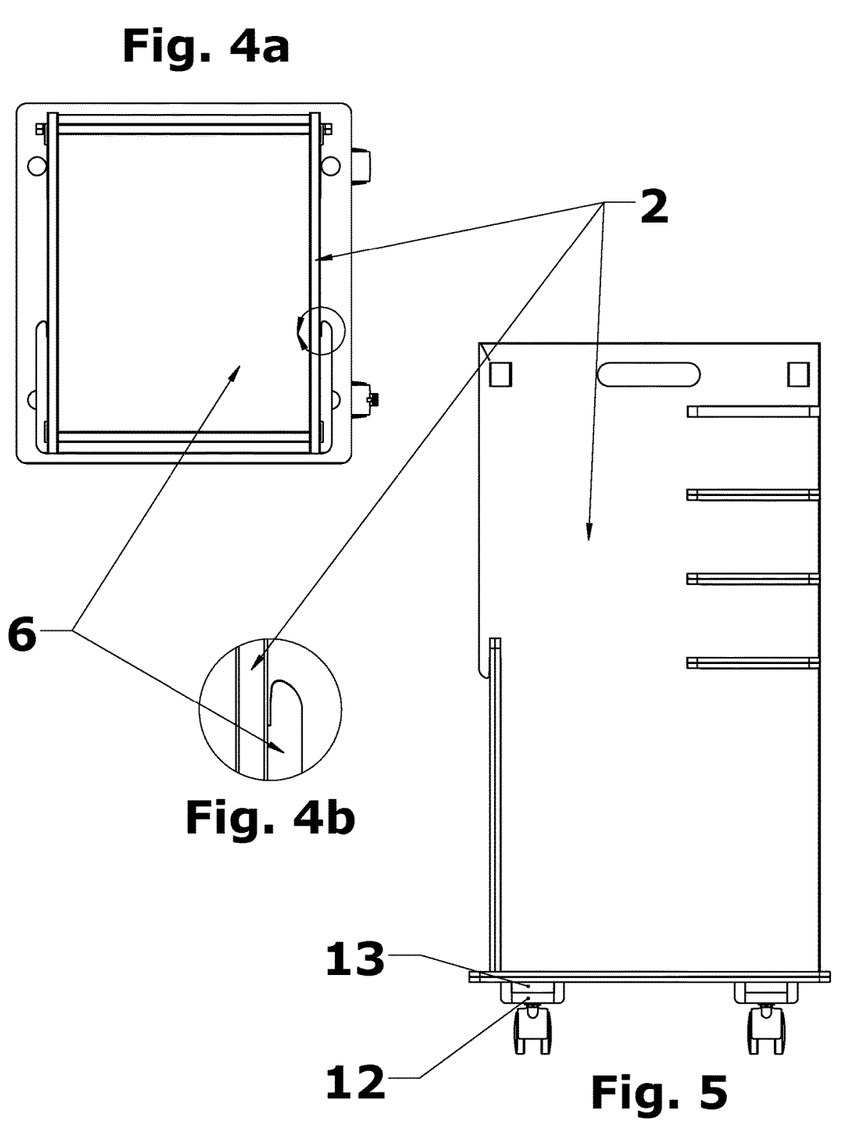
FIG. 4A is a top plan view of a fully assembled cart.
FIG. 4B is an enlarged detailed view of the encircled area shown in FIG. 4A.
FIG. 5 is a left side view of a fully assembled cart.

FIG. 2 shows from the front view how the drawers 5 reside on the shelves 4. It also illustrates the large bulk storage area in the lower half of this iteration of the cart. FIG. 3 gives a view of a right side elevation with a manipulation handle. FIGS. 4A and 4B show how the top 6 interlocks to the sides 2. FIG. 5 is a left side elevation view showing a caster mount 12 and a caster bridge 13 in relation to their attachment to the side 2.

Figures 6A, 6B, 7:
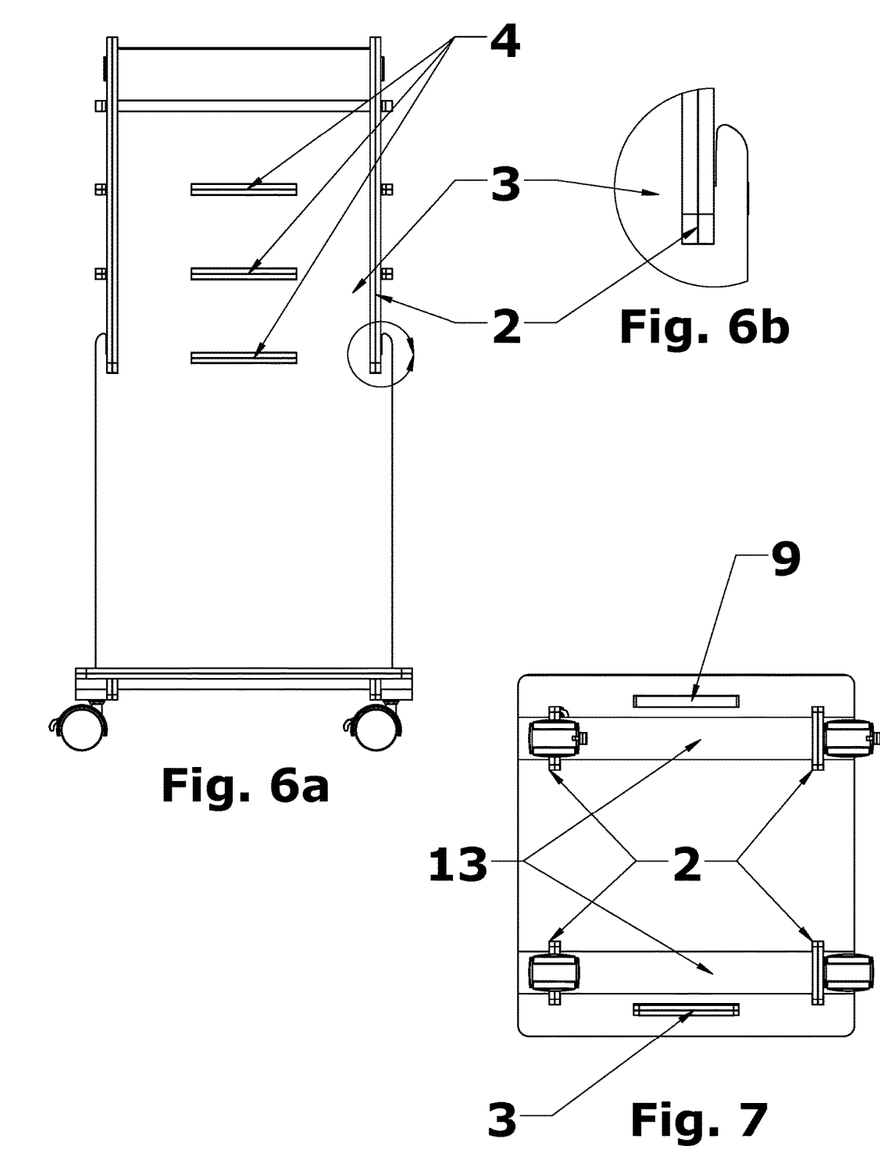
FIG. 6A is a back view of a fully assembled cart.
FIG. 6B is an enlarged detailed view of the encircled area shown in FIG. 6A.
FIG. 7 is a bottom plan view of a fully assembled cart.

FIG. 6A illustrates a back elevation view with the tabs of the shelves 4 protruding through the back 3 to provide structure and stability. FIG. 6B shows how the sides 2 interlock to the back 3. FIG. 7 depicts a bottom plan view that shows where the tab of the front trim piece 9, sides 2, and back 3 insert into the respective slits of the bottom 1 during assembly.

Figure 8:
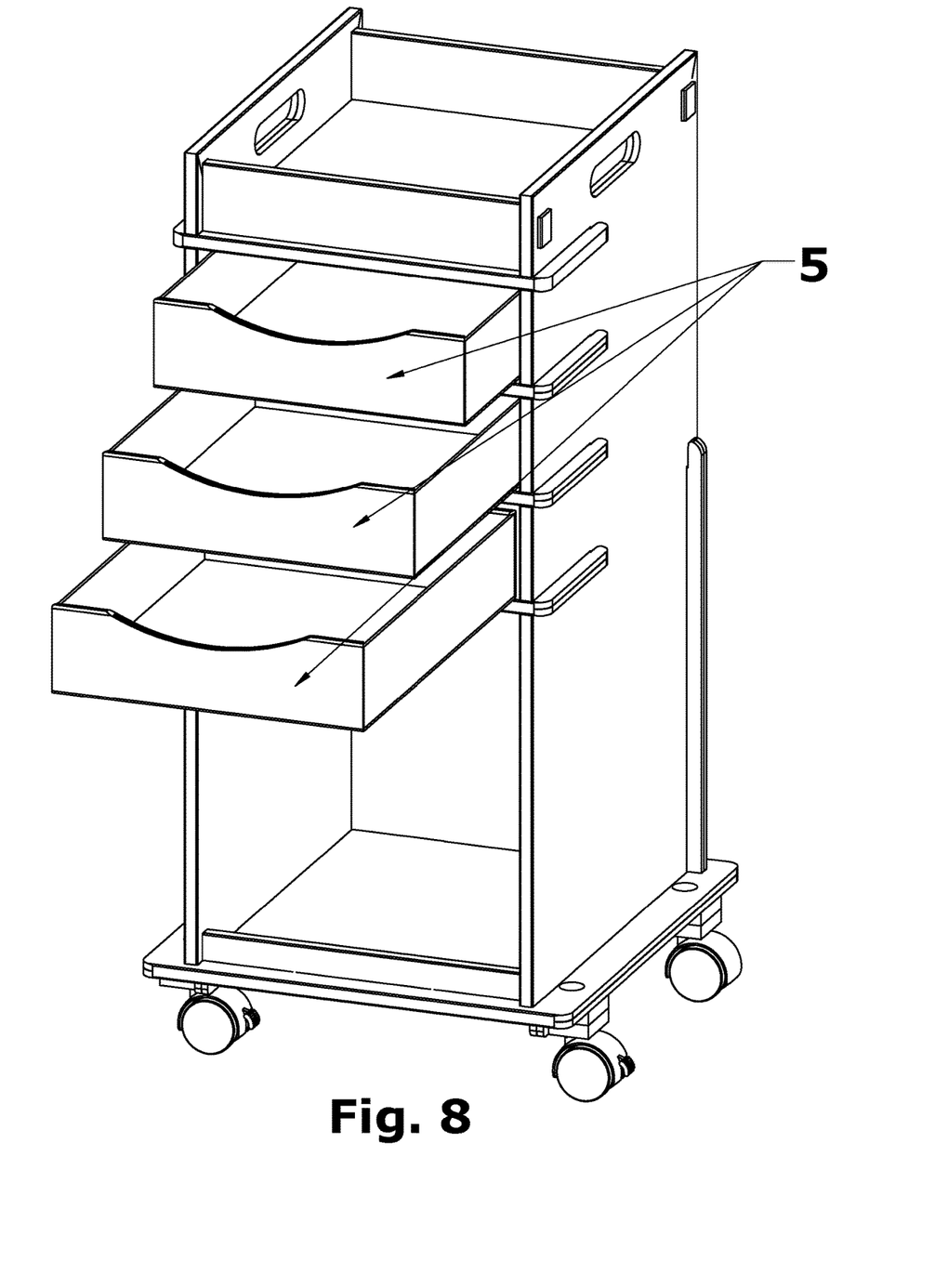
FIG. 8 is a front perspective view of a fully assembled cart with operating drawers in various open positions.

FIG. 8 demonstrates how the drawers 5 are completely removable and stowable.

Figure 9:
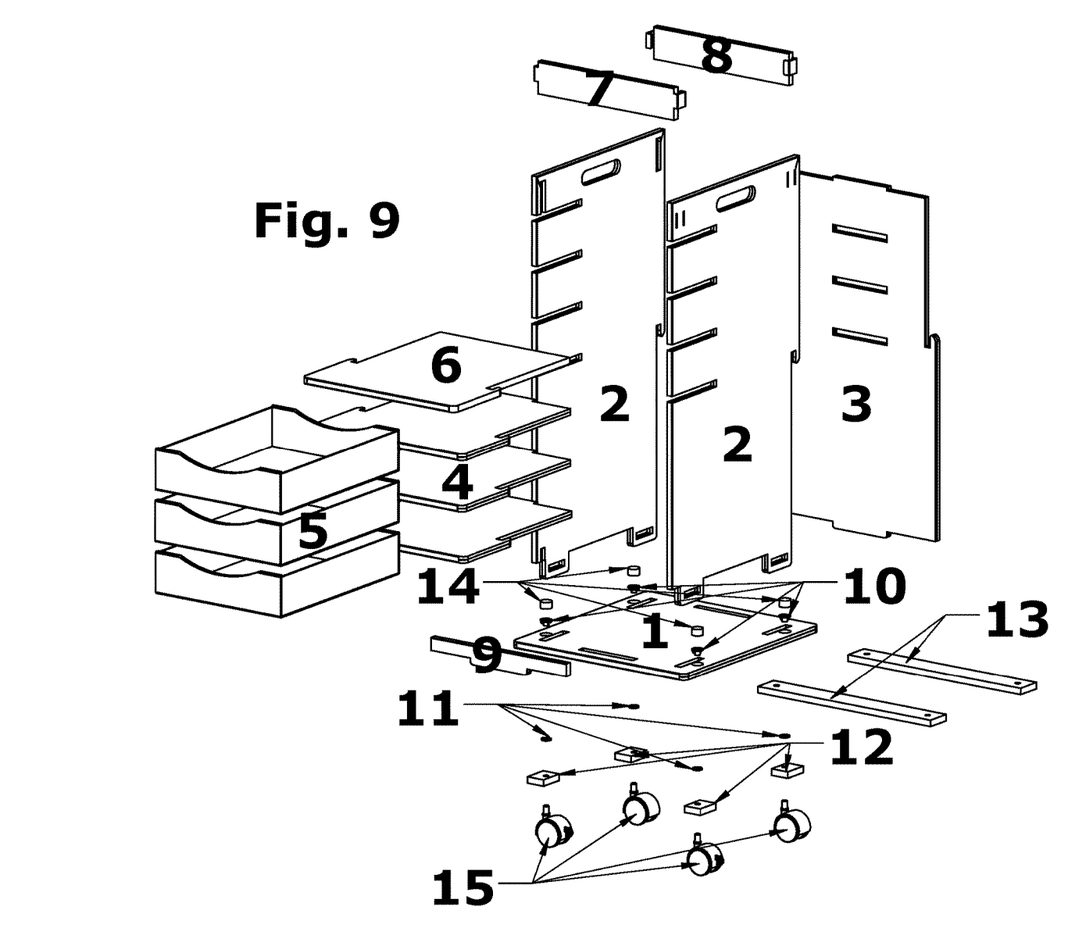
FIG. 9 is an exploded view of a cart showing the various parts of the cart oriented relative to their positions for final assembly.

FIG. 9 is an illustration of the easily assembled disposable/recyclable cart in an exploded view showing the following parts: bottom or base 1; left and right sides 2; back 3; shelves 4; drawers 5; top 6; top trim piece 7; top trim piece 8; bottom trim piece 9; t-nut 10; washer 11; caster mount 12; caster bridge 13; caster caps 14; and casters 15.

Figure 10:
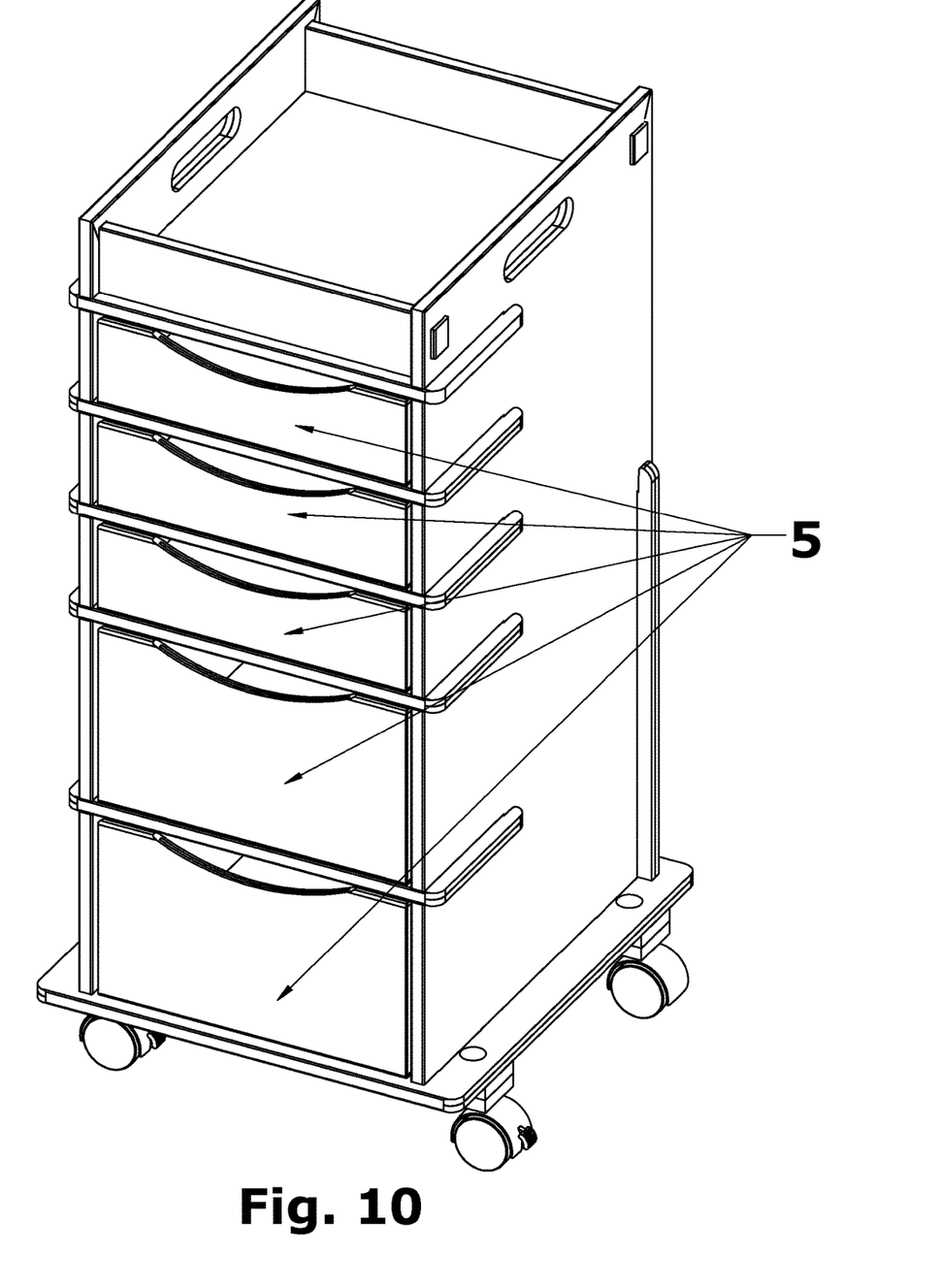
FIG. 10 is a front perspective view of another embodiment of a fully assembled cart.

FIG. 10 illustrates another example of the invention. In this example, the cart has five drawers 5, two of them being substantially taller vertically as compare to the other drawers. In this embodiment, the bottom trim piece 9 is not present. Instead, a drawer is present.

Figure 11:
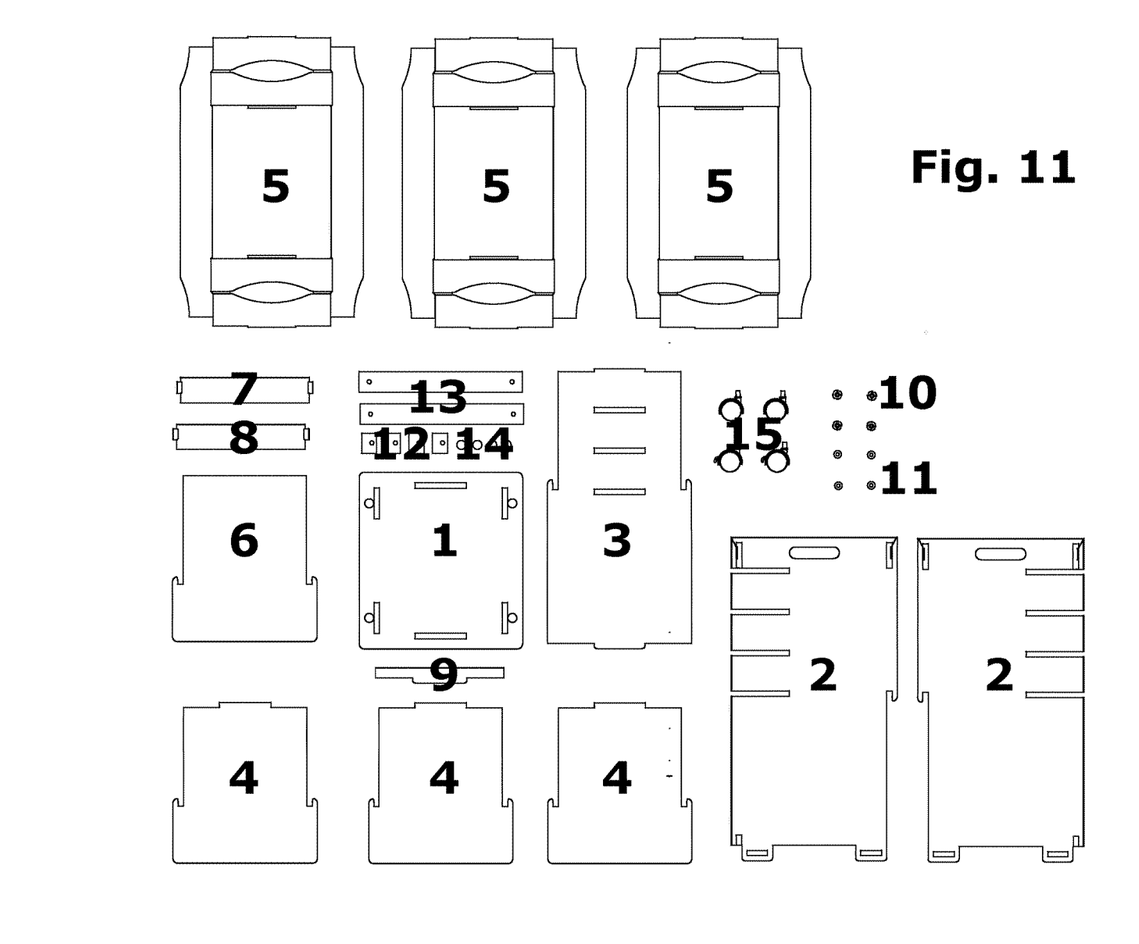
FIG. 11 is a layout view of all the parts of an exemplary embodiment of a cart.

FIG. 11 show a plan layout of the parts as the end user will receive them.

For assembly, after removing parts from packaging, the user will place the trim pieces 7 and 8 into the slot on each side 2, feeding the foldable tab to the exterior of the side of the cart. This foldable tab will be folded posteriorly if for the front trim piece 7, or anteriorly if for the rear trim piece 8. The trim piece tab that has protruded on the exterior towards the front or rear of the cart will be folded back towards the side, into the receiving slot, which will lock the trim piece to the side. The same will be done for the other trim piece with its tabs, and thusly for their attachment to the other side. At this time, the top 6 will be slid in horizontally from the front of the cart into the top slot on the sides 2 passing under the trim pieces 7, 8 and with the side tabs locking into the sides 2. Next, the back 3 will be aligned with the posterior portion of the sides 2, and the notched tabs on the sides 2 interlock with the notched tabs on the back 3, while the tab at the highest point at the top of the back 3 inserts into the tab slot on the underside of the top 6. At this point the shelves 4 are aligned to slide into the cart from the front, utilizing the interlocking tabs to engage the grooves on the sides 2. The tabs on the shelves 4 should be aligned to penetrate the slots on the back 3.

At this point of assembly, the entire unit is inverted, to attach the bottom or base 1. The bottom trim piece 9 is mated to the bottom 1 towards its front by inserting the tab into the slot. The bottom or base 1 is then pressed down gently onto the sides 2 and back 3, being careful to feed the tabs on the sides 2 and back 3 into the slots on the bottom 1, and making sure the bottom trim piece 9 fits precisely in the indentions in the sides 2. The caster bridges 13 are then fed transversely through the slots in the sides 2, flush with the left and right sides of the bottom 1. The caster mounts 12 are positioned by aligning their holes with the holes in the caster bridges 13. The casters 15 are installed with a washer 11 on the caster side, threaded through the caster mounts 12 into the t-nut 10 insert pre-installed in the caster bridge 13.

Preferably, four casters or wheels are attached in the manner described. Also preferably, the locking caster(s) is installed at the position(s) nearest to the open front of the cart. When the casters are all firmly attached, the cart is reverted to the functional orientation again, to ride on the casters. Four caster caps 14 are then placed into the holes on the upward facing side of the bottom 1 to aesthetically cover the caster mounting t-nuts 10.

Assembly of the drawers is as follows: the drawer flat 5 is laid in front of the user. The left and right drawer sides are folded up 90 degrees. With the sides in this position, the end tabs are then folded in towards each other, again 90 degrees. The front of the drawer is then folded up, over the drawer side end tabs and back down towards the bottom of the drawer, and pressed into the slot positioned there. The back of the drawer is folded up in a similar fashion. After the drawer has been folded up it is inserted into the cart body, to rest and ride on the shelves. When all drawers have been folded up in a similar manner, and inserted into the cart body, the easily assembled disposable/recyclable cart is ready for commission.

Preferably, when plastic caster mounts are used, the plastic caster mount is a factory-embedded, internally-threaded fastener, of the t-nut (or tee-nut) variety. The caster can mount with a washer below the caster mount, threaded into the aforementioned fastener.

Unless defined otherwise, all technical and scientific terms used herein have the same meaning as is commonly understood by one of skill in the art to which this invention belongs at the time of filing. The meaning and scope of terms should be clear; however, in the event of any latent ambiguity, definitions provided herein take precedent over any dictionary or extrinsic definition. Further, unless otherwise required by context, singular terms shall include pluralities and plural terms shall include the singular. Herein, the use of "or" means "and/or" unless stated otherwise. Furthermore, the use of the term "including", as well as other forms such as "includes" and "included" is not limiting. Similarly, the use of the terms "having" and "comprising" and other forms such as "has" or "comprised" are not limiting. All patents and publications referred to herein are incorporated by reference.

It is also to be understood that the terminology used herein is for the purpose of describing particular embodiments of the invention only, and is not intended to be limiting. It must be noted that, as used in this specification and the appended claims, the singular forms "a", "an" and "the" include plural referents unless the content clearly dictates otherwise.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the following claims.

What is claimed is:

1. A storage unit comprising
   a) a back having a first horizontal slot, a first tab extending upward from a top edge, a second tab extending downward from a bottom edge, and a vertical notch extending from each lateral surface;
   b) a first side and a second side, wherein each side includes
      i) a top groove extending from an anterior surface into an anterior portion of a side,
      ii) a first groove below the top groove, wherein the first groove extends from an anterior surface into an anterior portion of a side,
      iii) a first anterior vertical slot adjacent to a second anterior vertical slot, wherein both first and second anterior slots are near a top of a side,
      iv) a first posterior vertical slot adjacent to a second posterior vertical slot, wherein both the first and second posterior slots are near a top of a side, and
      v) an anterior tab with a horizontal slot and a posterior tab with a horizontal slot, wherein the anterior and posterior tabs are near a bottom of a side;

c) a top having
  i) a horizontal notch extending from each lateral surface of the top, wherein each horizontal notch inserts into a top groove of a side, and
  ii) a tenon in a ventral surface such that the first tab of the back inserts into the tenon of the top;
d) a bottom having
  i) a posterior opening such that the second tab of the back inserts into the posterior opening,
  ii) first and second anterior side openings, wherein an anterior tab of each side inserts into the first and second anterior side openings, and
  iii) first and second posterior side openings, wherein a posterior tab of each side inserts into the first and second posterior side openings;
e) a first shelf having
  i) a first horizontal notch extending from each lateral surface of the first shelf, wherein each first horizontal notch inserts into a first groove of a side, and
  ii) a first rear tab extending from a posterior surface such that the first rear tab inserts into the first horizontal slot of the back;
f) a first trim piece having a first and second foldable tab, wherein each foldable tab extends from a lateral side of the first trim piece such that each foldable tab inserts into the first anterior vertical slot of a side, folds over, and inserts into the second anterior vertical slot of a side,
g) a second trim piece having a first and second foldable tab, wherein each foldable tab extends from a lateral side of a second trim piece such that each foldable tab inserts into the first posterior vertical slot of a side, folds over, and inserts into the second posterior vertical slot of a side; and
h) a first and a second bridge, wherein the first bridge inserts through the horizontal slots of the anterior tabs of the first and second side and the second bridge inserts through the horizontal slots of a posterior tabs of the first and second side.

2. The storage unit of claim 1 further comprising at least a first caster mount, a first wheel, and a first nut, wherein the first caster mount attaches to the first wheel and to either the first or second bridge, and the first nut secures the first wheel in place.

3. The storage unit of claim 2 further comprising a second caster mount, a second wheel, a second nut, wherein the second caster mount attaches to the second wheel and to either the first or second bridge that is not already attached to a first caster mount, and the second nut secures the second wheel in place.

4. The storage unit of claim 3 further comprising three or more second caster mounts, three or more second wheels, and three or more second nuts.

5. The storage unit of claim 1, wherein the back includes a second horizontal slot below the first horizontal slot and each side includes a second groove below the first groove, wherein the second groove extends from an anterior surface of a side into an anterior portion of the side.

6. The storage unit of claim 5 further comprising a second shelf having
  a) a second horizontal notch extending from each lateral surface of the second shelf, wherein each second horizontal notch inserts into a second groove of a side, and
  b) a second rear tab extending from a posterior surface of the second shelf such that the second rear tab inserts into a second horizontal slot of the back.

7. The storage unit of claim 1, wherein the bottom further includes an anterior opening.

8. The storage unit of claim 7 further comprising a front bottom trim piece having a bottom tab that inserts into the anterior opening of the bottom.

9. The storage unit of claim 1 further comprising at least one drawer.

10. The storage unit of claim 1 further comprising a second shelf having
  a) a second horizontal notch extending from each lateral surface of the second shelf, wherein each second horizontal notch inserts into a second groove of a side, and
  b) a second rear tab extending from a posterior surface such that the second rear tab inserts into a second horizontal slot of the back.

11. The storage unit of claim 10 further comprising two drawers.

12. The storage unit of claim 10 further comprising three or more second shelves.

13. The storage unit of claim 12 further comprising three or more drawers.

14. The storage unit of claim 1, wherein the storage unit is comprised of cardboard, metal, plastic, wood, glass, or a combination thereof.

* * * * *